US010820976B2

(12) United States Patent
Flynn

(10) Patent No.: US 10,820,976 B2
(45) Date of Patent: Nov. 3, 2020

(54) PORTABLE ANIMAL THERAPY TABLE

(71) Applicant: Elizabeth A Flynn, Lakewood, CO (US)

(72) Inventor: Elizabeth A Flynn, Lakewood, CO (US)

( * ) Notice: Subject to any disclaimer, the term of this patent is extended or adjusted under 35 U.S.C. 154(b) by 301 days.

(21) Appl. No.: 16/007,380

(22) Filed: Jun. 13, 2018

(65) Prior Publication Data
US 2019/0053885 A1 Feb. 21, 2019

Related U.S. Application Data

(60) Provisional application No. 62/606,144, filed on Aug. 21, 2017.

(51) Int. Cl.
A61D 3/00 (2006.01)
A47B 3/10 (2006.01)
A47B 3/08 (2006.01)
A47B 3/083 (2006.01)
A01K 13/00 (2006.01)

(52) U.S. Cl.
CPC .............. A61D 3/00 (2013.01); A47B 3/083 (2013.01); A47B 3/0818 (2013.01); A47B 3/10 (2013.01); A01K 13/00 (2013.01); A47B 2003/0827 (2013.01); A47B 2003/0835 (2013.01)

(58) Field of Classification Search
CPC ... A47B 3/083; A47B 3/10; A47B 2003/0827; A47B 2003/0835; A01K 13/00; A61D 3/00; A61G 13/105

USPC ......... 108/34, 35, 38; 5/6, 5, 4, 3, 635, 630, 5/640; 128/845; 119/753
See application file for complete search history.

(56) References Cited

U.S. PATENT DOCUMENTS

| 58,462 | A | * | 10/1866 | Nellis | A47B 3/087 108/36 |
| 137,658 | A | * | 4/1873 | Cornell | A47B 3/087 108/36 |
| 633,203 | A | * | 9/1899 | Makinen | A47B 3/10 108/36 |
| 923,500 | A | * | 6/1909 | Dress | A47B 3/087 108/36 |
| 2,253,772 | A | * | 8/1941 | Edgren | B44C 7/02 108/62 |
| 3,029,115 | A | * | 4/1962 | Rachman | A47B 3/087 108/129 |
| 3,327,330 | A | * | 6/1967 | McCullough | A47G 9/10 5/640 |
| 4,574,412 | A | * | 3/1986 | Smith | A47C 20/021 5/632 |
| D295,904 | S | * | 5/1988 | McMahon | D30/118 |

(Continued)

Primary Examiner — Jose V Chen
(74) Attorney, Agent, or Firm — Leyendecker & Lemire, LLC

(57) ABSTRACT

A padded table for animal massage or body work having a flat square working surface with diagonally situated bumper pads supported on 4 sets of attached folding legs. Table construction includes two adjacent parallel sections joined in the middle with a piano-type hinge so that it may be closed and moved or carried easily as like a suitcase or unfolded to form a flat working surface. The double leg support structure on both sides of the adjacent parallel sections distributes the weight of animals who may move continually across the sections providing unique stability.

19 Claims, 4 Drawing Sheets

(56) References Cited

U.S. PATENT DOCUMENTS

| | | | | |
|---|---|---|---|---|
| 4,999,866 A | * | 3/1991 | Lindsey | A47G 9/062 |
| | | | | 5/417 |
| 5,009,170 A | * | 4/1991 | Spehar | A47B 3/10 |
| | | | | 108/132 |
| 5,765,502 A | * | 6/1998 | Haugh | A01K 1/0353 |
| | | | | 119/28.5 |
| D409,038 S | * | 5/1999 | Roja, Jr. | D6/601 |
| 6,334,400 B1 | * | 1/2002 | Nien | A47B 3/087 |
| | | | | 108/115 |
| 6,668,401 B2 | * | 12/2003 | Waters | A47C 21/00 |
| | | | | 5/504.1 |
| D542,478 S | * | 5/2007 | Andriola | D30/118 |
| D567,456 S | * | 4/2008 | Martin | D30/118 |
| 7,475,641 B2 | * | 1/2009 | Jin | A47B 3/087 |
| | | | | 108/132 |
| 7,549,183 B2 | * | 6/2009 | Dockendorf | A47D 11/00 |
| | | | | 5/425 |
| 7,823,517 B2 | * | 11/2010 | Roleder | A47B 3/087 |
| | | | | 108/27 |
| 2012/0084923 A1 | * | 4/2012 | Sveinsdottir | A47G 9/10 |
| | | | | 5/640 |
| 2018/0049399 A1 | * | 2/2018 | Menayan | A01K 1/015 |

* cited by examiner

PORTABLE ANIMAL THERAPY TABLE

RELATED APPLICATIONS

This application claims priority to and incorporates by reference U.S. Provisional Patent application No. 62/606,144 originally filed on Aug. 21, 2017, and which has the same inventor as the present application.

BACKGROUND OF THE INVENTION

The invention is generally related to folding tables and specifically to ones used in the art of animal therapy be that massage, chiropractic or acupuncture.

Using a standard massage table with animals that was built specifically for humans leads to a number of safety and comfort concerns. The rectangular shape does not lend itself to the natural behavior of specifically dogs to move around in a circle first in order to become physically comfortable. Even at a lowered height the single folding leg structure at two ends of the human massage table and rectangular shape does not provide stability for the table to remain upright should an animal move suddenly or leap off of the table, which happens frequently. Unlike humans, animals tend to move around during a massage therapy session increasing the risk that they might fall off of a standard massage table and incur an injury to themselves or the human practitioner.

DRAWING REFERENCE NUMERALS

10—Folding table
20—Top section
21—Rigid planar base
23—Low-density polyethylene (LDPE) foam padding
25—Open cell urethane foam padding
27—Bumper section LDPE foam padding
29—Cover
30—L-shaped bumper sections
40—Outside support legs
50—Inside support legs
60—Carrying handles
70—Tongue latch locking mechanisms
80—Ring latch locking mechanisms
100—Locking leg braces
110—U-brace table leg attachments
120—Piano-type hinge

DETAILED DESCRIPTION

Folding tables have been long been used in application for human use. Whether for cultural use as in tables for eating and playing board games, display purposes for all kinds of objects and in any situation where portability and storage of a table that can be folded is both efficient and necessary. Folding tables with padded tops are also employed for human use when delivering therapeutic services such as massage, chiropractic and acupuncture/acupressure.

What differs from the prior art about embodiments of the present folding table is that it is designed specifically for the comfort and safety of animals, as well as the comfort and safety of humans while engaged in the direct application of therapeutic service between species. In this way the needs of both the human and other species are considered primary and on the same level during the delivery of a therapeutic service, such as a massage.

The lowered height of the table relative to prior art massage tables intended for use with human clients allows the human therapist to remain comfortably seated during the delivery of a therapeutic service and while maintaining appropriate contact with the animal at all times. This ensures consistent safe management of the physical space shared by two different species one of which, animals, move around more during a therapeutic session than do humans.

The shape of the table accommodates the physical space needed by animals allowing them to move in a circle as they do instinctually before coming to a still position of comfort. The easier the animal is to work with the easier it is for the therapist to deliver the therapeutic service and the more effective that service is upon the body of an animal who is relaxed.

Embodiments of the massage table include diagonally placed corner bumpers that offer animals the comfort they instinctually seek in a position of side-lying rest, that being support for their spine(s). Coupled with the low-to-the-ground height of the table also provided with embodiments of the present invention, these bumpers create a space of safety and visual context for the animal so that any concern of falling off of the table is reduced.

Figure 1:
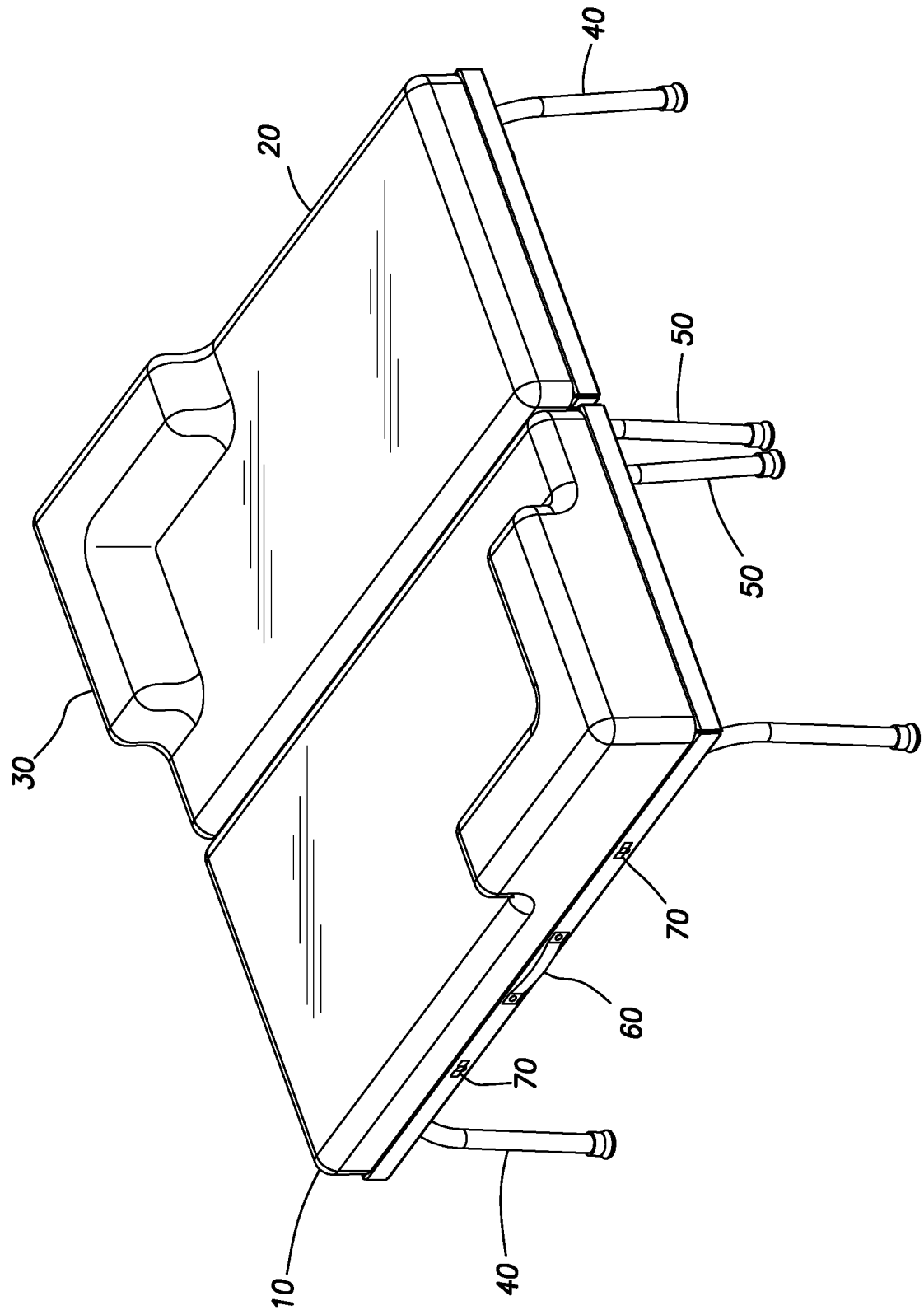
FIG. 1 is a perspective drawing of the table as when unfolded and seen from above according to one embodiment of the present invention.
Figure 2:
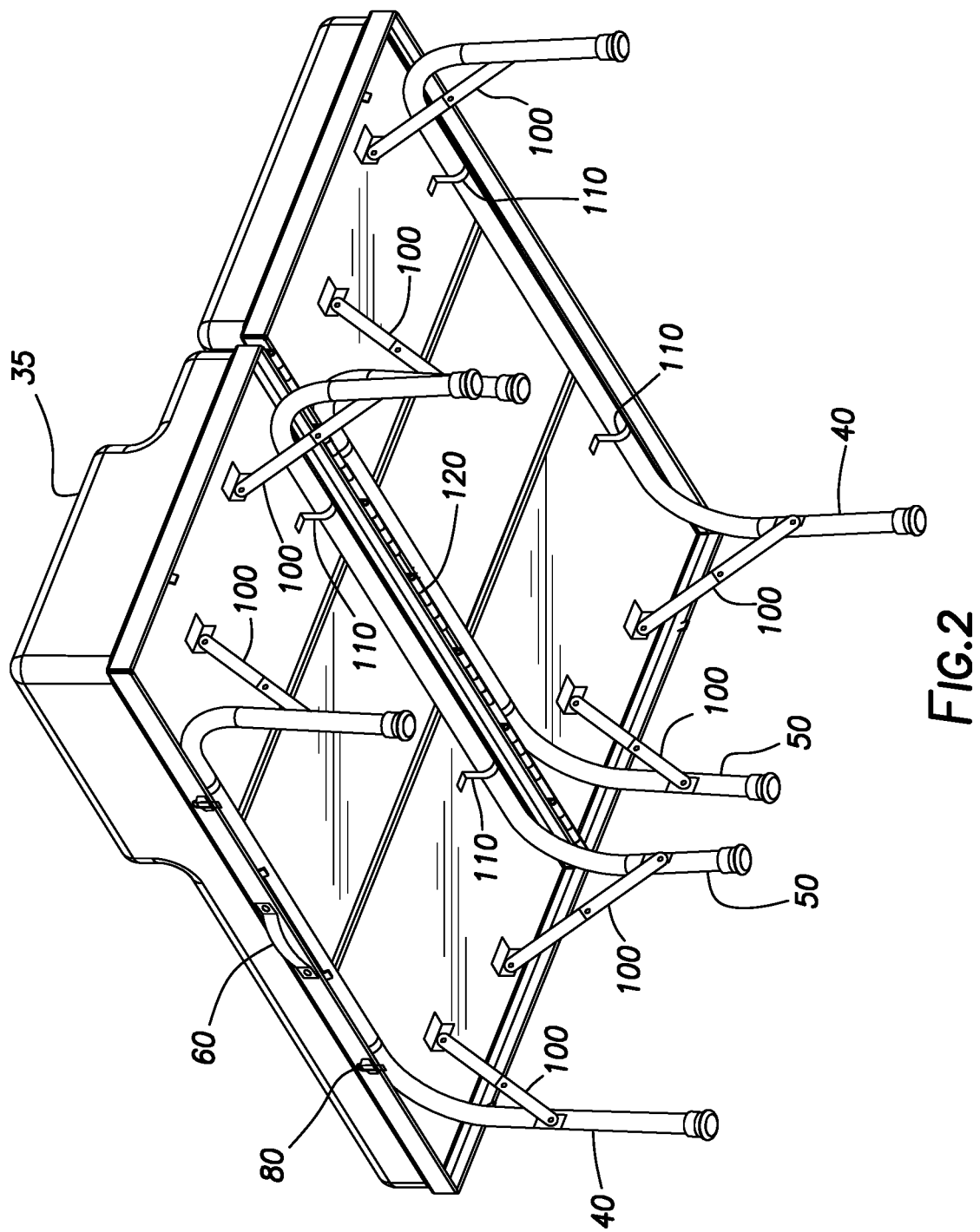
FIG. 2 is a perspective drawing of the table as when unfolded and seen from below according to one embodiment of the present invention.

As shown in FIG. 1, an embodiment of the folding table 10 is comprised of two identical rectangular-shaped sections 20 each long side measuring about 21 inches, each short side measuring about 10.5 inches for a total of about 42 inches square when unfolded. The two rectangular-shaped sections 20 are joined along their inside length by a piano-type hinge 120 as can be seen in FIG. 2. At two diagonally-situated opposite corners of the rectangular-shaped sections 20 there are raised bumper sections 30. Each bumper section 30 is about 4 inches high and about 3 inches wide having first and second arms extending orthogonally from a corner intersection to form an L-shape. These arms of the L-shaped sections 30 measures about 10 inches in length in some embodiments. Each bumper is typically comprised of a resilient foam material having a cover received over the foam.

The rigid planar base 21 of the rectangular-shaped sections 20 typically comprises plywood, OSB, or laminated wood upon which is affixed about 5 inches of low-density polyethylene (LDPE) foam padding 23. See FIG. 4. On top of the LDPE foam padding about 1 inch of open cell urethane foam padding 25 can be provided. The raised diagonal L-shaped bumpers 30 are typically constructed of LDPE foam padding 27. On the top and sides of the rectangular shaped sections 20 including the bumpers 30 there is a cover 29 typically comprised of 18 oz. PVC coated nylon fabric that is attached thereto such as, but not necessarily, by RF welding, staples or other mechanical fasteners, and/or adhesive bonding to the plywood, the LDPE and open cell foam padding.

On the underside of each rectangular shaped sections 20, attached to the outer perimeter at opposite corners are a first set of U-shaped double leg supports 40 as can be seen in FIG. 2 as well. On the underside of the rectangular shaped sections 20 and attached at the inner perimeter opposite corners there is a second set of U-shaped double leg supports 50. Each set of U-shaped double leg supports is typically constructed of hollow aluminum tubing, measuring ½ inch by 1/16 inch thick and be capped with rubber covers at the ends. Each set of U-shaped double leg supports is about 18 in height when the table is unfolded and the legs extended and secured in place for use. The height of the top surface area of the table off of ground level is about 24 inches in some embodiments.

On the long end of each rectangular shaped section 20 there is a padded handle 60 typically constructed of 1 inch open cell urethane foam covered with 18 oz. PVC coated nylon fabric whose ends can be attached with metal grommets.

Figure 5:
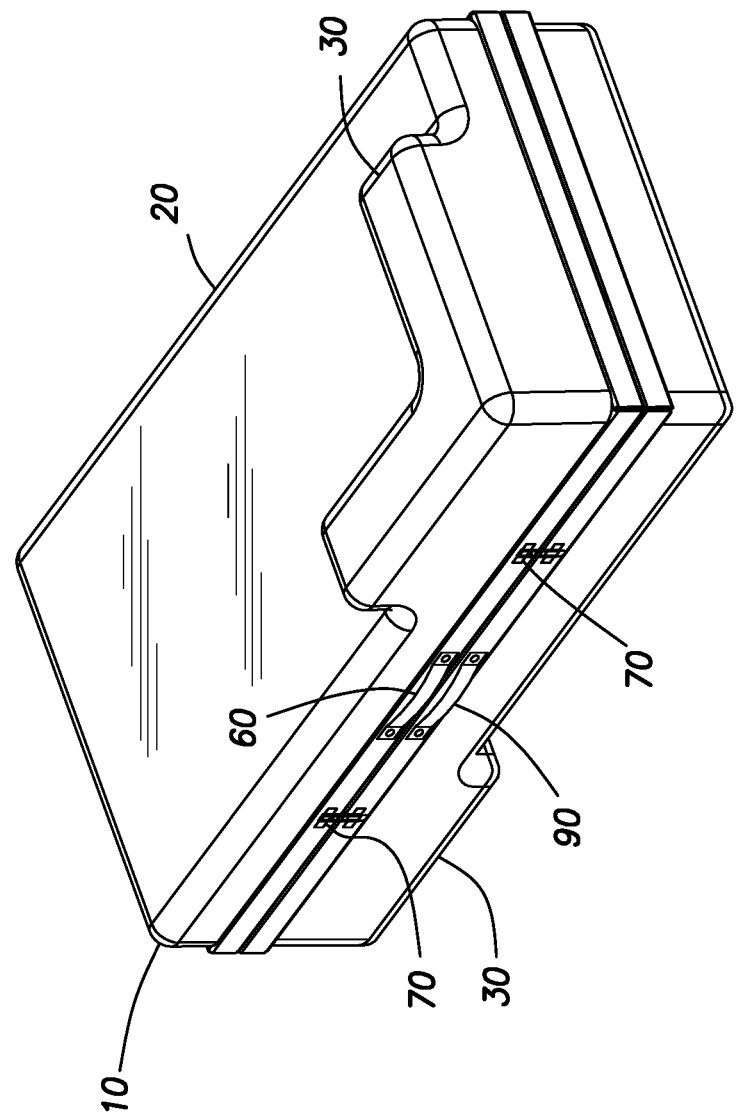
FIG. 5 is a perspective drawing of the table folded and locked for portability according to one embodiment of the present invention.

On the same long end of each rectangular shaped sections 20 there can be 2 toggle case latching tongues 70 for closing the table for portability. As shown in FIG. 2 a rectangular O-ring latch and lock brackets 80 are provided that when attached over latching tongues 70 allows for the table to be folded in half and locked for portability. FIG. 5 shows the table in its compact and folded configuration.

With reference to FIG. 2, locking support table leg braces 100 are provided that when deployed stabilize the U-shaped double leg supports 40 and 50. The locking support table leg braces can be pivotally attached to the rectangular shaped sections 20 with u-shaped brackets 110. The U-shaped brackets can be used to connect the U-shaped double leg supports 40 and 50 to the rectangular shaped sections 20 allowing the legs to be folded up or down. The piano-type hinge connecting brace 120 connects the rectangular-shaped sections 20 on respective long sides to each other to facilitate folding.

Figure 3:
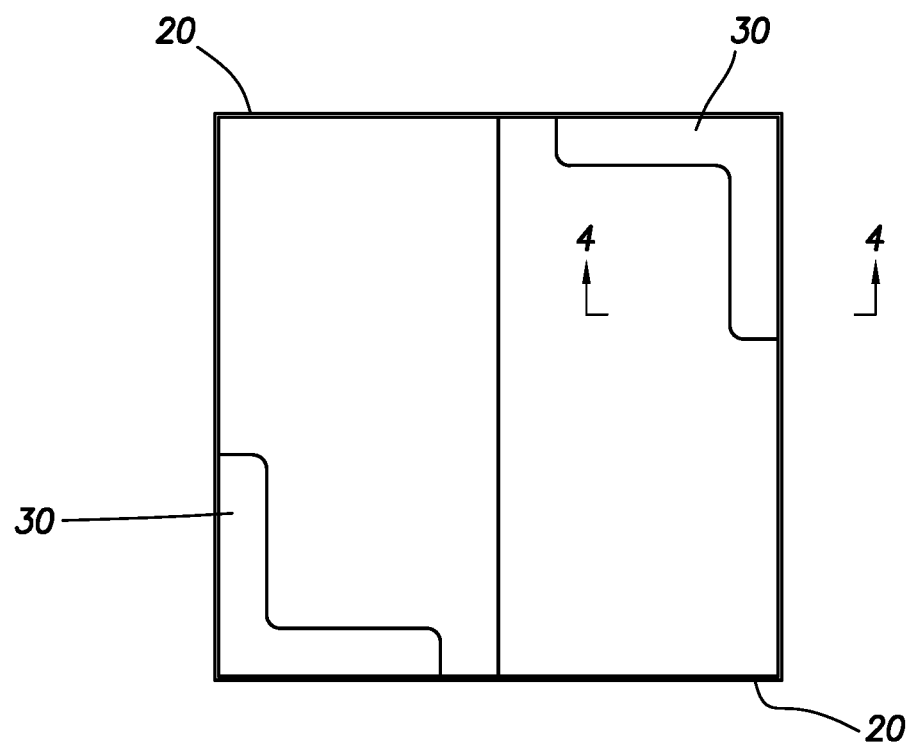
FIG. 3 is a top view of the table showing the diagonal placement of the comfort corners according to one embodiment of the present invention.

FIG. 3 is a top view of the embodiment of the table showing the positioning of the diagonal L-shaped bumpers 30 on the top of the table. The bumper sections 30 provide a surface against which an animal may rest against when lying on the table. Additionally, the bumpers reduce the risk that an animal may fall off of the table during a therapy session.

Figure 4:
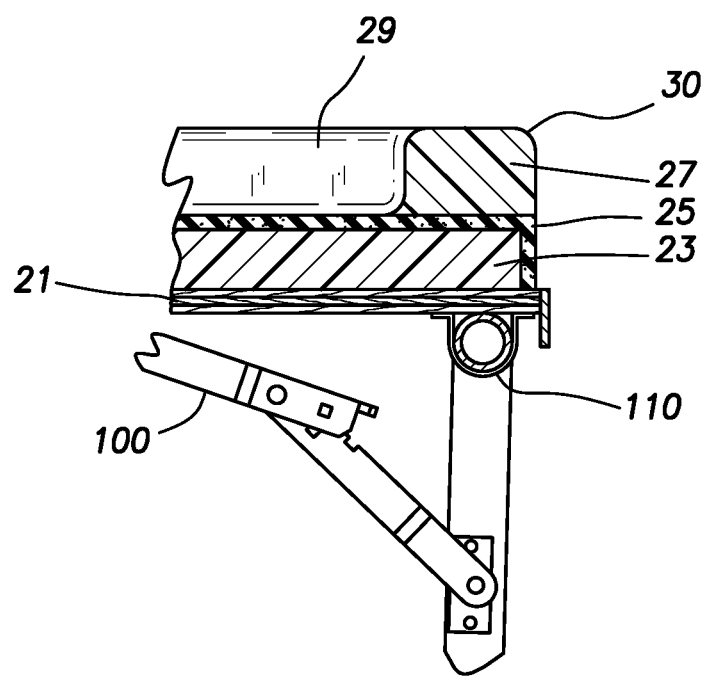
FIG. 4 is a partial cross sectional view of the table illustrating the structure of the table including a comfort corner according to one embodiment of the present invention.

FIG. 4 shows a partial cross section of the table and the diagonally-positioned L-shaped bumpers 30 illustrating both its typical height and width as previously described. A locking support table leg brace 100 is shown in greater detail and in partial movement to illustrate the locking mechanism that supports a U-shaped double leg supports 40 & 50.

As previously indicated FIG. 5 shows an embodiment of the table 10 in a closed and locked configuration with the latching tongues 70 received in the latch and lock brackets 80. The padded handles 60 are shown on both long sides of the rectangular shaped sections. The L-shaped bumpers 30 are shown as being on the outside of the table when it is locked and closed for portability. Both of the rectangular shaped sections 20 are folded along the piano-type hinge 120 and the U-shaped double leg supports 40 and 50 are folded inside the rectangular shaped sections 20 on both sides.

As indicated above the folding therapy table is typically used with animals, such as dogs, for therapeutic procedures, such as a massage. Initially, the table is deployed and set up. Next, the animal is placed on the padded top surface of the table. The animal is permitted to circle and get comfortable before beginning the procedure. Often, the animal will settle and lie down with its back close to or in contact with an L-shaped bumper section. Once the animal has settled, the procedure is performed. Since the overall height of the table is typically about 24-30 inches above the ground, a human therapist can usually perform the procedure while seated or kneeling. The low height of the table makes it easier for the animal to jump on or off of the table. Once the therapy has been completed the table can be folded back into its folded configuration.

I claim:

1. A folding therapy table comprising:
   rectangular-shaped first and second table top sections, each table top section including a first and second short sides, an exterior long side and an interior long side, the first and second table top sections joined by one or more hinges along respective interior long sides;
   a first exterior pair of table legs pivotally attached to the first table top section proximate the exterior long side of the first table top section;
   a first interior pair of table legs pivotally attached to the first table top section proximate the interior long side of the first table top section;
   a second exterior pair of table legs pivotally attached to the second table top section proximate the exterior long side of the second table top section;
   a second interior pair of table legs pivotally attached to the second table top section proximate the interior long side of the second table top section;
   a first and second foam pad assembly substantially covering the respective first and second table top sections, each foam pad assembly comprising:
   at least a first foam sheet;
   an L-shaped bumper extending upwardly from the foam sheet, wherein the L-shaped bumper is located proximate an intersection with the exterior long side and the first short side and diagonally from the other L-shaped bumper, the L-shaped bumper having first and second arm, the first arm extending along only a portion of the first short sides, and the second arm extending along only a portion of the exterior long side; and
   a cover, the cover enclosing the foam sheet and the L-shaped bumper, the edges of the cover being secured to the rectangular-shaped table top sections.

2. The folding therapy table of claim 1, wherein the first and second table top sections comprise a rigid substantially planer base.

3. The folding therapy table of claim 2, wherein the base is comprised of one of orientated strand board, plywood, fiberboard, and laminated wood.

4. The folding therapy table of claim 1, wherein each of the first exterior pair of table legs, the first interior pair of table legs, the second exterior pair of table legs, and the second interior pair of table legs comprise a u-shaped support leg member.

5. The folding therapy table of claim 4, wherein each u-shaped support leg member is comprised of aluminum.

6. The folding therapy table of claim 4, wherein each u-shaped support leg member has a height of 16-20 inches.

7. The folding therapy table of claim 4, wherein each u-shaped support leg member is attached to the respective first and second table top sections by way of a plurality of u-shaped brackets.

8. The folding therapy table of claim 4, further comprising a plurality of locking leg braces with each locking leg brace being coupled on one end to one of the first and second table top sections and wherein each locking leg brace is coupled to a u-shaped support leg member at another end thereof.

9. The folding therapy table of claim 1, wherein the first exterior pair of table legs, the first interior pair of table legs, the second exterior pair of table legs, and the second interior pair of table legs are all foldable between a deployed position and a folded position wherein in the deployed position the legs are generally orthogonal to a bottom surface of the respective first and second table top sections and wherein the folded position the legs are in generally parallel to the bottom surface of the respective first and second table top sections.

10. The folding therapy table of claim 9, wherein the first and second interior pair of table legs are located adjacent and next to each other when the table is in the folded position, and wherein the first and second exterior pair of table legs are located adjacent and next to each other when the table is in the folded position.

11. The folding therapy table of claim 10, wherein the first and second foam pad assemblies are facing outwardly when in the folded position.

12. The folding therapy table of claim 1, wherein the first foam sheet and L-shaped foam piece comprise Low Density Polyethylene.

13. The folding therapy table of claim 12, wherein each of the first and second foam pad assemblies further includes a cover, the cover being comprised of a fabric material.

14. The folding therapy table of claim 1, wherein each of the first and second foam pad assemblies further includes a cover, the cover being comprised of a fabric material.

15. The folding therapy table of claim 1, wherein each of the first and second foam pad assemblies further includes a second sheet, the second foam sheet comprising an open cell foam and being located on top of the first foam sheet.

16. The folding therapy table of claim 1, wherein the L-shaped bumper section is about 3-6 inches high.

17. The folding therapy table of claim 1, wherein the first and second legs of the L-shaped bumper section are about 8-12 inches long.

18. A method of using the folding therapy table of claim 1, the method comprising:
placing an animal on the folding therapy table;
positioning the animal against one of the L-shaped bumper sections; and
performing a therapeutic procedure on the animal.

19. The method of claim 18, further comprising:
unfolding the first and second table top sections, deploying the first and second exterior pairs of table legs, and deploying the first and second interior pairs of table legs.

\* \* \* \* \*